(12) United States Patent
Van Nuland et al.

(10) Patent No.: US 7,622,536 B2
(45) Date of Patent: Nov. 24, 2009

(54) APPARATUS AND METHOD FOR THE PRODUCTION OF POLYETHYLENE AND ETHYLENE COPOLYMERS

(75) Inventors: Tom Van Nuland, Baton Rouge, LA (US); Leo E. Reynders, Zoersel (BE)

(73) Assignee: ExxonMobil Chemical Patents Inc., Houston, TX (US)

( * ) Notice: Subject to any disclaimer, the term of this patent is extended or adjusted under 35 U.S.C. 154(b) by 0 days.

(21) Appl. No.: 12/089,847

(22) PCT Filed: Oct. 26, 2006

(86) PCT No.: PCT/EP2006/010325

§ 371 (c)(1),
(2), (4) Date: Apr. 10, 2008

(87) PCT Pub. No.: WO2007/051561

PCT Pub. Date: May 10, 2007

(65) Prior Publication Data

US 2008/0262173 A1    Oct. 23, 2008

(30) Foreign Application Priority Data

Nov. 7, 2005    (GB)    ................... 0522706.1

(51) Int. Cl.
*C08F 2/00*    (2006.01)
*B01J 19/24*    (2006.01)
*C08F 10/02*    (2006.01)

(52) U.S. Cl. .................. 526/88; 526/64; 526/920; 422/131

(58) Field of Classification Search .............. 526/64, 526/88, 920; 422/131; 585/503
See application file for complete search history.

(56) References Cited

U.S. PATENT DOCUMENTS

| 3,810,975 A | 5/1974 | Brooke |
| 7,435,784 B2 * | 10/2008 | Lee et al. ............... 526/64 |
| 2004/0214968 A1 | 10/2004 | Berhalter et al. |

FOREIGN PATENT DOCUMENTS

| CA | 1008597 | * | 4/1977 |
| GB | 2134121 |  | 8/1984 |

* cited by examiner

Primary Examiner—Fred M Teskin

(57) ABSTRACT

The invention relates to an apparatus for the high pressure polymerisation of ethylene which comprises a high pressure reactor; a conduit for the supply of ethylene to the reactor, the conduit being provided with a preheater for heating the ethylene; a waste heat boiler for the production of medium pressure steam; a source of high pressure steam; and a steam distribution system comprising a medium pressure steam net for the distribution of medium pressure steam from the waste heat boiler, in which the preheater comprises first, second and third sections and the steam distribution system is such that the first section can be supplied with steam from the medium pressure steam net, the second section can be supplied with steam from the medium pressure steam net or with high pressure steam and the third section can be supplied with high pressure steam.

21 Claims, 2 Drawing Sheets

US 7,622,536 B2

APPARATUS AND METHOD FOR THE PRODUCTION OF POLYETHYLENE AND ETHYLENE COPOLYMERS

CROSS REFERENCE TO RELATED PATENT APPLICATIONS

This application is a national stage filing of International Patent Cooperation Treaty Publication No. WO07/051,561, filed Oct. 26, 2006, which claims priority from Great Britain Application 0522706.1, filed Nov. 7, 2005, the disclosures of which are fully incorporated herein by reference.

FIELD OF THE INVENTION

The invention relates to an apparatus and method for the polymerization of ethylene under high pressure, optionally in the presence of comonomers, and especially an apparatus and method for heating the ethylene prior to polymerization.

BACKGROUND OF THE INVENTION

High pressure reactors, such as tubular reactors and autoclaves, are used for the polymerization of ethylene at high pressure, for example, at pressures of over 1000 bar, and up to 3000 bar or even higher. In such processes, fresh ethylene from an ethylene supply together with recycled ethylene, optionally together with comonomer, is compressed in a series of compressors to the reactor pressure and is then introduced into the reactor where polymerization takes place, typically initiated by the compounds such as peroxides or oxygen. The compressed ethylene may be split into several streams, the first of which enters the reactor at one end (the front end) and the others (known as "sidestreams") enter at points along the length of the reactor or, alternatively, all of the ethylene may enter the reactor at the front end. In order to start the polymerization reaction off, it is necessary to heat the first ethylene stream to a temperature at or above the "light off" temperature of the particular initiator or blend of initiators used. That heating is achieved by passing that stream of ethylene through a heater, known as a preheater.

In the reactor a portion of the ethylene is polymerized and a hot mixture comprising polymer and unreacted monomer leaves the reactor via an outlet and passes through a high pressure let down valve into a separation system in which the polymer is separated from unreacted ethylene gas. The unreacted ethylene gas is then treated in a recycle system to remove polyethylene waxes and to cool it before it is recompressed for return to the reactor. In many ethylene polymerization plants, the ethylene recycle system includes a boiler, known as a waste heat boiler, in which the heat from the recycled ethylene is used to boil water to produce steam, typically medium pressure steam, which is used to heat at least part of the preheater. In that way, some of the heat generated by the exothermic polymerization reaction can be used productively, thereby reducing the overall energy required to operate the plant with obvious economic and environmental benefits.

Typically, high pressure polymerization plants produce a range of grades of polymer varying in such characteristics as molecular weight, comonomer content, haze and density. One way of influencing the properties of the product polymer is by controlling the temperature profile in the reactor including the temperature at which the ethylene enters the reactor. Accordingly, the set temperature to which the ethylene is heated by the preheater will vary over a wide range, for example, from 130° C. to 220° C., depending on the particular grade to be produced at that time.

One known type of preheater comprises a first section of heating jacket which uses the medium pressure steam from the waste heat boiler and a second section which uses high pressure steam generated by a conventional boiler. Steam temperature is related to its pressure, and so the second section is at a higher temperature than the first section.

In order to produce certain grades of polymer requiring a very high reactor inlet temperature, the medium pressure steam in the first section of the preheater may be supplemented by the addition of high pressure steam. That addition succeeds in raising the pressure and temperature of the medium pressure steam and hence the heat input into that first section. However, the increase in pressure of the medium pressure steam also increases the boiling point of the water in the waste heat boiler and therefore reduces the temperature difference between that boiling water and the recycle ethylene, with a consequent drop in the efficiency of the waste heat boiler. That drop in efficiency has two undesirable consequences. Firstly, the amount of medium pressure steam generated is reduced and so more high pressure steam must be used in the preheater thereby increasing the fuel cost. Secondly, there is a decrease in the cooling of the recycle ethylene in the waste heat boiler and therefore there is an increased burden on the other heat exchangers in the recycle system, with a consequent increase in load on the plant cooling water.

For grades where low reactor inlet temperatures are required, no high pressure steam is used and parts of the first section of the preheater are blocked, again reducing the steam production of the waste heat boiler with the same two undesirable consequences mentioned above.

High pressure ethylene polymerization plants usually have a system for the generation and distribution of low pressure steam, typically referred to as a low pressure steam net. Low pressure steam has many uses, for example, heating wax knock-out pots in the ethylene recycle system to keep the contents molten. Depending on the location of the plant, in winter low pressure steam is often used to prevent water pipes from freezing, and therefore the demand for low pressure steam may rise in winter. Low pressure steam may be obtained by flashing off the condensate collected in the high pressure steam net. Although that method is economical, the generation of low pressure steam is thereby tied to the generation of high pressure steam and during times when the demand for low pressure steam outstrips the volume available from that route it is typically necessary to release some high pressure steam into the low pressure steam net, with a consequent increase in the cost of high pressure steam generation.

SUMMARY OF THE INVENTION

The present invention provides an apparatus which comprises:
a high pressure reactor;
a conduit for the supply of ethylene to the reactor, the conduit being provided with a preheater for heating the ethylene;
a waste heat boiler for the production of medium pressure steam;
a source of high pressure steam; and
a steam distribution system comprising a medium pressure steam net for the distribution of medium pressure steam from the waste heat boiler,
in which the preheater comprises first, second and third sections and the steam distribution system is such that the first section can be supplied with steam from the medium pressure steam net, the second section can be supplied with steam from the medium pressure steam net or with high pressure steam, as desired, and the third section can be supplied with high pressure steam.

For polymer grades not requiring especially high or low reaction inlet temperatures, the preheater may typically operate with medium pressure steam in the first and second sections, with controlled amounts of high pressure steam being used in the third section as necessary to reach the desired reactor inlet temperature. When it is desired to produce a grade requiring a high reactor inlet temperature, the second section can be switched over, independently of the first section, to high pressure steam, thereby boosting the heat input into the preheater without adding high pressure steam to the medium pressure steam. While taking the second section off medium pressure steam will reduce the consumption of the medium pressure steam somewhat, the reduction will usually be less than that caused by addition of high pressure steam to the medium pressure steam and so production of the medium pressure steam in the waste heat boiler is generally improved during production of polymer grades requiring high inlet temperatures, as compared to the known system. In many cases, the improved efficiency of medium pressure steam generation and use will provide a reduction in the cost of generating high pressure steam and will also reduce the load on the plant cooling water, which will in turn often make possible improved cooling of ethylene prior to entry into the secondary compressor with consequent increases in ethylene throughput and plant productivity.

Preferably, the steam supply system comprises a low pressure steam net and means for releasing medium pressure steam into that low pressure steam net. In that way, when a polymer grade requiring a low reactor inlet temperature is to be made, for example, medium pressure steam can be released into the low pressure steam net. During times of high demand for low pressure steam, that can reduce or remove the need to release high pressure steam into the low pressure steam net. Moreover, release of medium pressure steam into the low pressure steam net reduces the pressure of the medium pressure steam, thereby increasing the efficiency of the waste heat boiler, with the benefits mentioned above. The means for releasing the medium pressure steam into the low pressure steam net will typically comprise a control valve.

Preferably, the steam supply system also comprises means to add high pressure steam to the medium pressure steam net. The addition of high pressure steam into the medium pressure system net and hence into the first and optionally the second sections of the preheater is desirable, for example, during start up of the polymerization apparatus or during reactor upsets when the stream of recycle ethylene will typically not be hot enough to generate medium pressure steam in the waste heat boiler. The addition of high pressure steam to the medium pressure steam net may also be appropriate during the production of polymer grades requiring a very high reactor inlet temperature. In this embodiment, therefore, the first section of the preheater can be heated with medium pressure steam (when available), optionally supplemented by high pressure steam or, in the absence of medium pressure steam, by high pressure steam alone. The second section of the preheater can be supplied with either steam from the medium pressure net or with high pressure steam from the high pressure net, as desired at the time.

The steam distribution system is arranged to supply high pressure steam to the third section of the preheater. Preferably, the steam distribution system includes means such as a control valve for controlling the flow of high pressure steam into the third section of the preheater. In that way, the heat input into the preheater can be easily modified to give fine control over the temperature the ethylene is heated to and allow for compensation for variation in the heat input into the first and second sections of the preheater and for variation in the flow rate of the ethylene. The third section of the preheater may also be switchable between high pressure steam and medium pressure steam, like the second section. Preferably, however, the third section of the preheater communicates only with the high pressure steam net.

The apparatus may include more than one source of high pressure steam. For example, there may be a source of high pressure steam which supplies high pressure steam to the second section of the preheater and a separate source of high pressure steam which supplies the third section of the preheater. The terms "source of high pressure steam" and "high pressure steam net" should be understood to include embodiments having multiple sources of high pressure steam. Preferably, however, there is a single source of high pressure steam, for example, a high pressure steam boiler or an array of such boilers. Preferably, the steam distribution system includes a high pressure steam net for the distribution of high pressure steam from the high pressure steam source.

The term "preheater" as used herein refers to any construction which allows the high pressure ethylene passing through the conduit from the compressor to the reactor to be heated by steam and which has three sections as described above. The preheater may also include additional sections, which may also be heated by steam or may be heated by other means, for example, by an electrical heater, or by heat exchange with a hot liquid. Preferably, however, the preheater comprises the first, second and third sections as described above, only. The first, second and third sections of the preheater will each comprise a means for exchanging heat from the steam to the ethylene. Any suitable heat exchange means may be used. Preferably, the first, second and third sections of the preheater each include a steam jacket around the conduit. Each section may include one or more parts, for example, one or more steam jackets, having the same steam supply arrangements. For example, the first section may include two or more steam jackets each being connected in a similar way to the medium pressure steam net. Each steam jacket will typically comprise one or more pipe sections. Preferably, each pipe section has a connection to a condensate net for efficient removal of condensate.

The temperature of the ethylene will rise as it passes through the preheater. The first, second and third sections of the preheater may be arranged in any order along the length of the conduit. For reasons of heat transfer efficiency, it is preferred that the third section of the preheater, which will, in general, be at a higher steam temperature than the first section and the second section (leaving aside the times at which the second section is also being supplied with high pressure steam), is downstream of the first and second sections. Preferably, the second section is downstream of the first section and the third section is downstream of the second section.

The term "medium pressure steam" as used herein refers to steam produced by the waste heat boiler. The actual pressure of the medium pressure steam will vary over a wide range for the reasons described above but is preferably in the range of from 4 to 30 bar, more preferably in the range of from 7 to 15 bar.

The term "high pressure steam" refers to steam which is not produced in the waste heat boiler and is typically of higher pressure than the medium pressure steam. The pressure of the high pressure steam may also vary over a wide range, but it is preferably in the range of from 15 to 70 bar, more preferably in the range of from 25 to 40 bar.

The term "low pressure steam" refers to steam which typically has a lower pressure than the medium pressure steam. The pressure of the low pressure steam may also vary, in use, over a wide range but is preferably in the range of from 1.5 to 6 bar, more preferably in the range of from 2 to 4 bar.

The term "net" as used in relation to the distribution of steam refers to an arrangement of conduits, typically also including associated devices such as valves, emergency pressure release devices etc, for the distribution of steam from its point or points of generation to its point or points of use. The medium pressure steam net will include conduits for the transport of steam from the waste heat boiler to the first and second sections of the preheater and, optionally, to a valve for the release of medium pressure steam into the low pressure steam net. The medium pressure steam net may also include conduits for the distribution of the medium pressure steam to any other locations where the medium pressure steam is used. The medium pressure steam net may also communicate with a valve through which high pressure steam may be added, when desired, to the medium pressure steam, as mentioned above, and at certain times when the waste heat boiler is not producing steam, for example during reactor start up, the medium pressure steam net may be filled with high pressure steam.

The term "ethylene" should be taken to include mixtures of ethylene with other components typically used in the high pressure polymerization of ethylene, such as comonomers, modifiers and initiators, unless the contrary is obvious from the context.

The high pressure reactor may be any reactor suitable for the high pressure polymerization of ethylene, optionally together with one or more comonomers. Such reactors are well known to the skilled person. In one embodiment, the high pressure reactor is a tubular reactor. The reactor will include an inlet for a stream of ethylene to be polymerized and usually other inlets for the addition of ethylene sidestreams, comonomer, initiator and chain transfer agents. The reactor will also include an outlet for the product mixture which will typically comprise principally unreacted ethylene and polymer, but may also comprise other components such as initiator, comonomer, chain transfer agent, impurities from the ethylene supply and degradation products such as carbon dioxide.

From the reactor outlet, the product mixture will typically pass through a high pressure let down valve and eventually into a separation system in which unreacted ethylene is separated from the polymer. The unreacted ethylene passes via the recycle system back to the compressors. The recycle system typically includes one or more wax knock-out pots and heat exchangers for cooling the ethylene. In a preferred embodiment, the waste heat boiler is located in the ethylene recycle. Other possible locations for the waste heat boiler include on a product cooler between the high pressure let down valve and the separation system, or even on the reactor itself. The term "waste heat boiler" includes any device or devices which use heat produced by the polymerization to produce steam.

Preferably, the steam distribution system comprises a valve for the supply of medium pressure steam to the second section of the preheater and a valve for the supply of high pressure steam to that second section. Preferably, both valves are block valves. Preferably, the steam distribution system is arranged such that only one of those valves is open during use of the apparatus.

In a preferred embodiment, the apparatus includes control means for the control of the steam supply to the first, second and third sections of the preheater. Especially preferably, the apparatus includes a temperature sensor downstream of the outlet of the preheater and upstream of the inlet to the reactor for monitoring of the temperature of the ethylene in the region of the reactor inlet. Preferably, the control means is arranged to operate in response to an output signal from that temperature sensor. The control means will also typically include means to input a desired value for the reactor inlet ethylene temperature, with the control means being arranged to control the steam supply to the first, second and third sections of the preheater in response to that desired value and in response to the output signal of the temperature sensor. In general, the control means will be arranged primarily to bring the actual temperature of the ethylene entering the reactor via the conduit to within set limits of the desired temperature and to maintain the ethylene temperature within those limits. That will typically be the prime function of the control means, in order to avoid the inlet temperature straying from the set limits and consequent reactor upsets causing undesirable variation in the quality of the polymer or loss of production. Preferably, the control means will also be arranged to maximise production of medium pressure steam and to thereby optimise the efficiency of the waste heat boiler.

As mentioned above, the demand for low pressure steam may vary from time to time, for example, due to changes in the weather. The control means therefore preferably includes means by which the amount of medium pressure steam released to the low pressure steam net can be changed in response to changes in demand for low pressure steam. For example, the control means may be arranged such that a target value can be set for the degree to which the valve through which medium pressure steam is released into the low pressure steam net is open, and the control means adjusts the flow of high pressure steam to the third section of the preheater in order to achieve that target value while maintaining the reactor inlet temperature at the desired value.

Alternatively, the control means may include means by which the flow of high pressure steam into the third section of the preheater can be increased or decreased, with an increase in that flow causing a reduction in the use of medium pressure steam in the first (and second) sections, thereby favouring release of medium pressure steam to the low pressure steam net.

In one embodiment, the steam supply system comprises a pressure sensor for monitoring the pressure of the steam in the medium pressure steam net and the control means operates in response to the output of the pressure sensor. The control means may include a pressure controller which receives the output of the pressure sensor and which controls the means to release medium pressure steam into the low pressure steam net and the means to release high pressure steam into the medium pressure steam net in response to that output and in response to a set point. Advantageously, the pressure controller is arranged so that a target pressure may be set by an operator or by another part of the control system. Especially advantageously, the apparatus includes a temperature controller which sets the set point of the pressure controller in response to the output of a temperature sensor for monitoring the ethylene temperature in the region of the reactor inlet.

In an alternative embodiment, the control means includes a computer programmed to control the steam supply to the first, second and third sections of the preheater in response to the output signal of a temperature sensor for monitoring the temperature of the ethylene in the region of the reactor inlet. Preferably, the computer is also programmed to release steam from the medium pressure steam net to the low pressure steam net to optimize total energy consumption.

The invention also provides a method of heating ethylene in a preheater in a high pressure ethylene polymerization apparatus, in which the preheater comprises first, second and third sections and the method involves:

generating medium pressure steam using waste heat;

providing high pressure steam from a source of high pressure steam;

supplying medium pressure steam, optionally supplemented with high pressure steam, to the first section of the preheater;

supplying to the second section either the same steam as supplied to the first section or high pressure steam;

supplying high pressure steam to the third section; and changing the heat input into the preheater by changing the steam supplied to the second section from the same steam as supplied to the first section to high pressure steam, or vice versa.

The medium pressure steam will typically be generated using a waste heat boiler. The high pressure steam will usually be provided by a high pressure steam boiler.

As explained above, during start up of the polymerization apparatus, waste heat will not be available and therefore the steam supplied to the preheater will be high pressure steam. However, once polymerization has commenced waste heat will be available to generate the medium pressure steam.

The preheater is arranged upstream of the high pressure reactor, that is, the ethylene is heated by the preheater before entering an inlet into the reactor. Preferably, the method involves selecting a desired reactor inlet temperature. Preferably, the method involves monitoring the actual temperature of the ethylene in the region of the reactor inlet. More preferably, the method involves controlling the steam supply to the sections of the preheater in accordance with the desired reactor inlet temperature and the measured actual reactor inlet temperature. In particular, the method advantageously involves controlling the pressure of the medium pressure steam in accordance with the desired reactor inlet temperature and the measured actual reactor inlet temperature. Preferably, changes to the steam supplied to the second section are made in accordance with the desired reactor inlet temperature. Advantageously, the flow of high pressure steam into the third section is controlled in accordance with the desired reactor inlet temperature and the measured actual reactor inlet temperature.

Advantageously, the method involves releasing medium pressure steam into a low pressure steam net. That release may be controlled in response to demand on the low pressure steam net, as well as in response to the desired reactor inlet temperature and the measured actual reactor inlet temperature.

The medium pressure steam is optionally supplemented with high pressure steam, for example, when an especially high reactor inlet temperature is desired or during reactor upsets. However, preferably during normal operation (that is, excluding reactor start and reactor upsets) the medium pressure steam is not supplemented with high pressure steam.

DETAILED DESCRIPTION OF THE DRAWINGS

One embodiment according to the invention will now be described in more detail for the purpose of illustration only with respect to the Figures, in which.

DETAILED DESCRIPTION OF THE INVENTION

Figure 1:
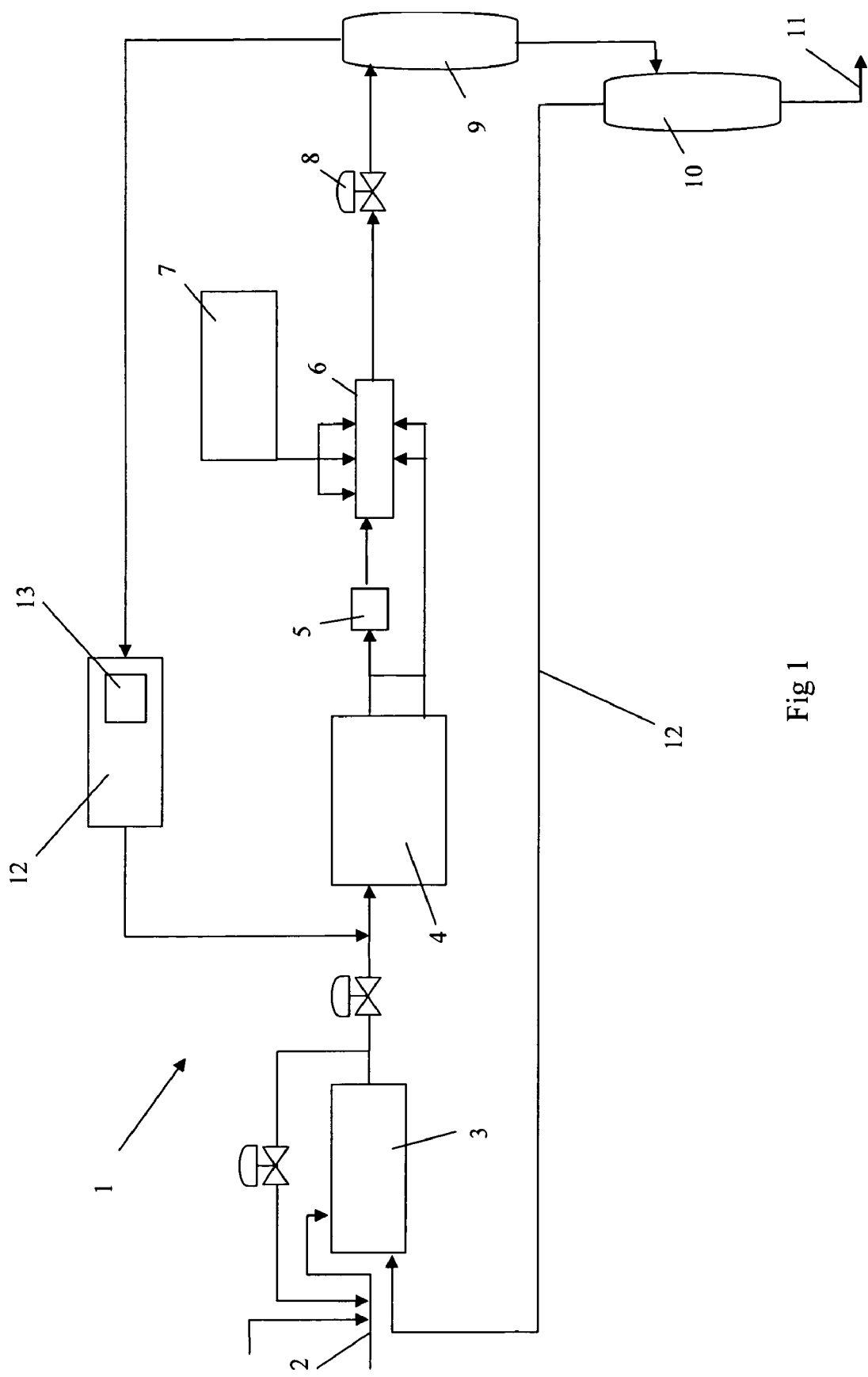
FIG. 1 shows a polymerization plant in schematic form.

FIG. 1 shows a polymerization plant 1 including an ethylene feed line 2 which supplies ethylene at a pressure of 70 bar to a primary compressor 3 which compresses the ethylene to a pressure of approximately 300 bar. The outlet of the primary compressor 3 communicates through a pipe having a valve with the inlet of a two-stage reciprocating secondary compressor 4 which compresses the ethylene and other reaction components to a pressure of 3000 bar. The compressed ethylene leaving the secondary compressor 4 is split into two streams, one of which passes through the preheater 5 and then enters the front end of the tubular reactor 6. The other stream is split into two sidestreams which enter the tubular reactor 6 at points along its length. The tubular reactor is also provided along its length with several initiator injection points which are fed from the initiator injection system 7.

From the tubular reactor 6 the mixture of polymer and unreacted monomer passes through high pressure let down valve 8 into high pressure separator 9 where it is separated into product polymer and unreacted ethylene. The polymer then passes to low pressure separator 10 where further residual ethylene is separated out and finally through pipe 11 to an extruder (not shown). Unreacted ethylene from the high pressure separator passes back through the recycle gas system 12 which includes a waste heat boiler 13 to the inlet of the secondary compressor 4. Low pressure unreacted monomer gas passes from the low pressure separator 10 back to the primary compressor 3.

The preheater 5 heats the ethylene stream entering the front end of the tubular reactor 6 up to a temperature at which the initiator will start to decompose, thereby initiating polymerization. The temperature of the ethylene leaving the preheater 5 and entering the inlet of reactor 6 is monitored by a temperature sensor (not shown in FIG. 1).

The polymerization reaction is highly exothermic and the tubular reactor 6 includes a number of cooling jackets to cool the reaction mixture. The product mixture leaving the tubular reactor 6 and passing through the high pressure let down valve 8 is still hot, however, when it enters high pressure separation vessel 9 and some of that heat is retained by the ethylene gas passing through the recycle system 12. The waste heat boiler 13 cools the hot ethylene stream and uses that heat to generate medium pressure steam. The recycle system 12 also includes heat exchangers to further cool the ethylene as well as wax knock-out pots for the collection of waxes. The medium pressure steam generated in waste heat boiler 13 flows to the preheater 5 via conduits (not shown in FIG. 1) where it is used to heat the ethylene going into the front end of reactor 6.

Figure 2:
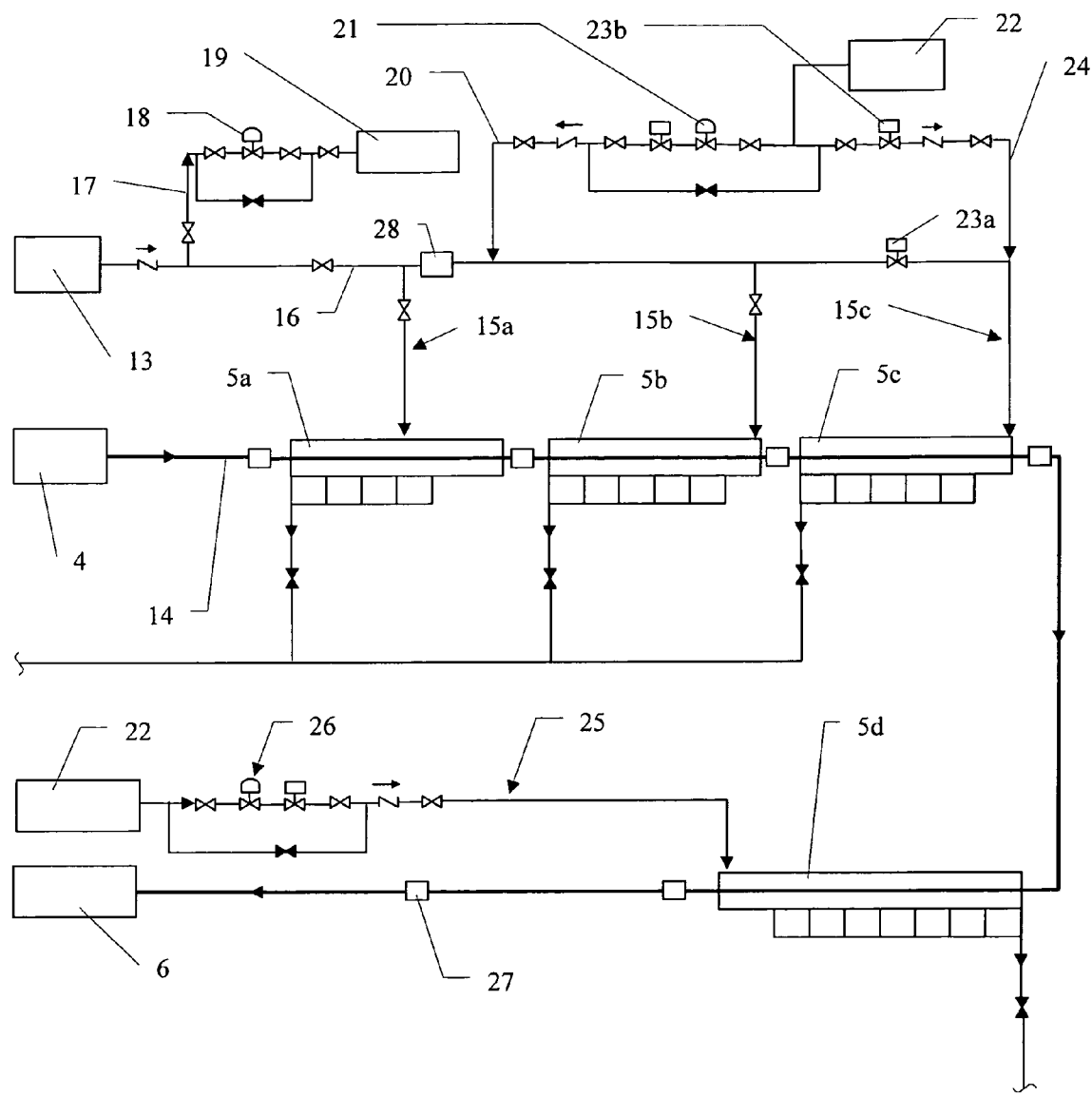
FIG. 2 shows in schematic form the preheater and the associated steam distribution system of the plant shown in FIG. 1.

FIG. 2 depicts the layout of the preheater 5 and the associated steam supply system. Line 14 represents the ethylene conduit which extends from the secondary compressor 4 to the front end of the tubular reactor 6, with the arrows showing the direction of the ethylene flow. The preheater 5 includes four steam jackets 5a, 5b, 5c and 5d which are arranged in that order along the length of the conduit 14 in the direction of the ethylene flow. Those steam jackets 5a, 5b, 5c and 5d each have an inlet for steam and a series of outlets through which condensate drains. The condensate flows via a series of conduits (not shown in FIG. 2) to a condensate treatment facility (not shown in FIG. 2). The steam jackets 5a, 5b, 5c and 5d are largely similar in construction, principally differing only in length.

The steam inlets of jackets 5a, 5b and 5c each communicate via a conduit 15a, 15b and 15c, respectively, with medium pressure steam conduit 16 which carries medium pressure steam from the waste heat boiler 13. Conduit 16 communicates, via conduit 17 and control valve 18, with a low pressure steam net 19. Conduit 16 also communicates, via conduit 20 and control valve 21, with high pressure steam net 22. The control valves 18 and 21 are for maintenance purposes each provided with a bypass loop including a manually operated valve which in normal operation is closed.

Located on the medium pressure steam conduit 16 between the junctions with conduits 15b and 15c to steam jackets 5b and 5c, respectively, is a block valve 23a. Conduit 15c also communicates via conduit 24 having block valve 23b with the high pressure steam net 22.

The steam inlet of the most downstream steam jacket 5d communicates, via conduit 25 and control valve 26, with the high pressure steam net 22. The control valve 26 is provided with a bypass which is similar to the ones on valves 18 and 21.

The ethylene conduit 14 is provided with a temperature sensor 27 located between the downstream end of the steam jacket 5d and the inlet of the reactor 6 for measuring the temperature of the ethylene as it flows into the front end of the reactor 6. The medium pressure steam conduit 16 is provided with a pressure sensor 28 for measuring the pressure of the steam in that conduit. Both temperature sensor 27 and the pressure sensor 28 are connected to a control system (not shown in FIG. 2) which monitors their outputs and controls the medium to low pressure steam control valve 18, the high to medium pressure steam control valve 21, block valves 23a and 23b and high pressure steam control valve 26 in response to those outputs and in response to a set value of inlet temperature input into the control system.

Steam jackets 5a and 5b are therefore arranged to be supplied, via conduits 15a and 15b and medium pressure steam conduit 16, with medium pressure steam from waste heat boiler 13. Those two steam jackets 5a and 5b together constitute the first section of the preheater 5.

When desired, the medium pressure steam can be supplemented with high pressure steam by opening control valve 21, thereby allowing high pressure steam from the high pressure steam net 22 to flow through conduit 20 into medium pressure steam conduit 16.

When it is desired to reduce the pressure of the medium pressure steam, opening of control valve 18 allows medium pressure steam to flow from medium pressure steam conduit 16, through conduit 17 into the low pressure steam net 19.

When block valve 23a is open and block valve 23b is closed, the steam jacket 5c, which constitutes the second section of the preheater 5 of the invention, is supplied with medium pressure steam from the medium pressure conduit 16 (which, when control valve 21 is open, will be supplemented with high pressure steam from the high pressure steam net 22). Closing block valve 23a and opening block valve 23b switches the steam supply to steam jacket 5c over to high pressure steam, and closing block valve 23b and opening block valve 23a switches it back again. In normal circumstances, only one of the block valves 23a and 23b should be open at any one time.

Steam jacket 5d constitutes the third section of the preheater 5 of the invention. It is supplied with high pressure steam via conduit 25 with the flow of high pressure steam being controlled by control valve 26.

During start up and certain reactor upsets, the desired reactor inlet temperature is input into the control means. Control valve 18 to the low pressure steam net is closed, control valve 21 is opened to allow high pressure steam into the medium pressure steam line 16 and from there into steam jackets 5a, 5b and 5c (block valve 23a being open and block valve 23b being closed). High pressure steam is also supplied to steam jacket 5d. Once polymerization has commenced and the waste heat boiler 13 is generating medium pressure steam, control valve 21 can be closed.

When a grade of polymer requiring a relatively low reactor temperature is required, steam jackets 5a, 5b and 5c will be supplied with medium pressure steam from medium pressure steam conduit 16 and control valve 18 will be partially open, releasing some medium pressure steam to the low pressure steam net 19. Control valve 26 will be closed and little or no steam will be supplied to steam jacket 5d.

When an intermediate reactor inlet temperature is required, control valve 18 is closed to prevent release of medium pressure steam to the low pressure steam net 19 and control valve 26 is partially opened, allowing some high pressure steam to flow into the steam jacket 5d.

When a high reactor inlet temperature is required, block valve 23a is closed and block valve 23b is opened so that steam jacket 5c comes onto high pressure steam. If a very high inlet temperature is required, control valve 21 may be opened to allow some high pressure steam into the medium pressure steam, thereby increasing the heat input into steam jackets 5a and 5b.

When there is a higher demand for low pressure steam, for example, during winter, the control system can be set to allow more high pressure steam into the steam jacket 5d and to release more medium pressure steam to the low pressure steam net.

It will be appreciated that the above description is a summary of the operation of the system and that during normal operation the control system continuously adjusts the position of the various valves in order to keep the temperature of the ethylene entering into the reactor as close to the desired temperature as possible and in order to optimize the total energy consumption.

Although preferred embodiments have been depicted and described in detail herein, it will be apparent to those skilled in the relevant art that various modifications, additions, substitutions, and the like can be made without departing from the spirit of the invention and these are, therefore, considered to be within the scope of the invention as defined in the claims which follow. To the extent that our description is specific, this is solely for the purpose of illustrating preferred embodiments of our invention and should not be taken as limiting our invention to these specific embodiments. The use of subheadings in the description is intended to assist and is not intended to limit the scope of our invention in any way.

What is claimed is:

1. An apparatus for the high pressure polymerization of ethylene which comprises:
  a high pressure reactor;
  a conduit for the supply of ethylene to the reactor, the conduit being provided with a preheater for heating the ethylene;
  a waste heat boiler for the production of medium pressure steam;
  a source of high pressure steam; and
  a steam distribution system comprising a medium pressure steam net for the distribution of medium pressure steam from the waste heat boiler,
  in which the preheater comprises first, second and third sections and the steam distribution system is such that the first section of the preheater can be supplied with steam from the medium pressure steam net, the second section of the preheater can be supplied with steam from the medium pressure steam net or with high pressure steam and the third section of the preheater can be supplied with high pressure steam.

2. An apparatus as claimed in claim 1 in which the steam distribution system comprises a low pressure steam net and means for releasing medium pressure steam into that low pressure steam net.

3. An apparatus as claimed in claim 1 or claim 2 in which the steam distribution system comprises means for releasing high pressure steam into the medium pressure steam net.

4. An apparatus as claimed in claim 1 in which the steam distribution system comprises a valve for the supply of steam from the medium pressure steam net to the second section of the preheater and a valve for the supply of high pressure steam to that second section of the preheater.

5. An apparatus as claimed in claim 4 in which both valves are block valves.

6. An apparatus as claimed in claim 1 in which the steam distribution system comprises a control valve for the control of the flow of high pressure steam into the third section of the preheater.

7. An apparatus as claimed in claim 1 which includes control means for the control of the steam supply to the first, second and third sections of the preheater.

8. An apparatus as claimed in claim 7 which includes a temperature sensor downstream of the outlet of the preheater and inside or upstream of the inlet to the reactor for monitoring the temperature of the ethylene and which produces an output signal, and in which the control means is arranged to operate in response to that output signal.

9. An apparatus as claimed in claim 2 in which the means for releasing medium pressure steam into that low pressure steam net can be adjusted to change the amount of medium pressure steam released to the low pressure steam net.

10. An apparatus as claimed in claim 7 in which the steam distribution system comprises a pressure sensor for monitoring the pressure of the steam in the medium pressure steam net and which produces an output signal and the control means operates in response to the output signal of the pressure sensor.

11. An apparatus as claimed in claim 1 in which the first section of the preheater is upstream of the second section of the preheater and the second section of the preheater is upstream of the third section of the preheater.

12. An apparatus as claimed in claim 1 in which each section of the preheater comprises a steam jacket around the conduit for the supply of ethylene to the reactor.

13. An apparatus as claimed in claim 1 or claim 12 which comprises an ethylene recycle system and the waste heat boiler is located in that ethylene recycle system.

14. An apparatus as claimed in claim 1 in which the reactor is a tubular reactor.

15. An apparatus for the high pressure polymerization of ethylene which comprises:
  a tubular reactor;
  a conduit for supply of ethylene to the tubular reactor, the conduit being provided with a preheater for heating the ethylene;
  a waste heat boiler for the production of medium pressure steam using heat generated by the polymerization reaction;
  a high pressure steam boiler; and
  a steam distribution system comprising a medium pressure steam net for the distribution of steam from the waste heat boiler and a high pressure steam net for the distribution of steam from the high pressure steam boiler, in which the preheater comprises first, second and third sections, each section comprising at least one steam jacket, and in which the steam jacket or jackets of the first section of the preheater communicate with the medium pressure steam net, the steam jacket or jackets of the second section of the preheater communicate via block valves with both the medium pressure steam net and the high pressure steam net, and the steam jacket or jackets of the third section of the preheater communicate via a control valve with the high pressure steam net.

16. A method of heating ethylene in a preheater in a high pressure ethylene polymerization apparatus, in which the preheater comprises first, second and third sections and the method comprises:
  generating medium pressure steam using waste heat;
  providing high pressure steam from a source of high pressure steam;
  supplying medium pressure steam, optionally supplemented with high pressure steam, to the first section of the preheater;
  supplying to the second section of the preheater either the same steam as supplied to the first section of the preheater or high pressure steam;
  supplying high pressure steam to the third section of the preheater; and
  changing the heat input into the preheater by changing the steam supplied to the second section of the preheater from the same steam as supplied to the first section of the preheater to high pressure steam, or vice versa.

17. A method as claimed in claim 16 which comprises controlling the flow of high pressure steam into the third section of the preheater.

18. A method as claimed in claim 16 or claim 17 which comprises releasing medium pressure steam into a low pressure steam net.

19. A method as claimed in claim 16 in which during normal operation the medium pressure steam is not supplemented with high pressure steam.

20. A method as claimed in claim 16 in which during startup of the reactor or during a reactor upset, high pressure steam is added to the medium pressure steam.

21. An apparatus for the high pressure polymerization of ethylene which comprises:
  a high pressure reactor for the polymerization of ethylene at a pressure of at least 1000 bar;
  a conduit for the supply of ethylene to the reactor,
  a preheater for heating the ethylene in the conduit to a temperature of from 130 to 220° C. having a first heating section, a second heating section and a third heating section;
  a waste heat boiler for the production of medium pressure steam at from 4 to 15 bar;
  a source of high pressure steam at from 15 to 70 bar; and
  a steam distribution system connecting the waste heat boiler and the source of high pressure steam to the preheater;
  a medium pressure steam net in said steam distribution system connected to receive medium pressure steam from the waste heat boiler and supply medium pressure steam to the first heating section and the second heating section,
  a high pressure steam net in said steam distribution system connected to receive high pressure steam from the high pressure steam source and supply high pressure steam to the second or third heating section; and
  a valve for controlling the supply of steam from the medium pressure steam net to the second heating section and a valve for controlling the supply of high pressure steam to the second heating section.

* * * * *